US012618943B2

(12) United States Patent
Stockmaster

(10) Patent No.: US 12,618,943 B2
(45) Date of Patent: May 5, 2026

(54) GLOBAL NAVIGATION SATELLITE SYSTEM (GNSS) SPOOFER PROTECTION

(71) Applicant: BAE SYSTEMS Information and Electronic Systems Integration Inc., Nashua, NH (US)

(72) Inventor: Michael H. Stockmaster, Cedar Rapids, IA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 299 days.

(21) Appl. No.: 18/608,242

(22) Filed: Mar. 18, 2024

(65) Prior Publication Data

US 2025/0291062 A1     Sep. 18, 2025

(51) Int. Cl.
| | |
|---|---|
| *G01S 7/36* | (2006.01) |
| *G01S 19/01* | (2010.01) |
| *G01S 19/03* | (2010.01) |
| *G01S 19/21* | (2010.01) |

(52) U.S. Cl.
CPC .............. *G01S 7/36* (2013.01); *G01S 19/015* (2013.01); *G01S 19/03* (2013.01); *G01S 19/215* (2013.01)

(58) Field of Classification Search
CPC .......... G01S 7/36; G01S 19/015; G01S 19/03; G01S 19/215

USPC ............................................... 342/13, 16, 17
See application file for complete search history.

(56) References Cited

U.S. PATENT DOCUMENTS

| | | | |
|---|---|---|---|
| 7,142,159 B1 | 11/2006 | Farley | |
| 11,374,636 B2 | 6/2022 | Lai et al. | |
| 2017/0227650 A1* | 8/2017 | Grobert | .................... H04K 3/65 |

OTHER PUBLICATIONS

"GNSS Spoofing Scenarios with SDRs" , retrieved from the Internet at: https://gpspatron.com/gnss-spoofing-scenarios-with-sdrs/, published Sep. 26, 2021.

* cited by examiner

*Primary Examiner* — Vladimir Magloire
*Assistant Examiner* — Ashley Brown Raynal
(74) *Attorney, Agent, or Firm* — Scott J. Asmus

(57) ABSTRACT

Techniques for spoofer protection for GNSS receivers. An example methodology includes receiving one or more characteristics of a detected spoofer signal provided by a GNSS spoofer characterization system. The spoofer signal is transmitted by a GNSS spoofer. The one or more characteristics of the detected spoofer signal may include, for instance, one or more of a direction to the GNSS spoofer, a range to the spoofer, a location of the spoofer, and a code type of the detected spoofer signal. The methodology continues with generating parameters for a simulated GNSS signal that is configured to block the GNSS spoofer and transmitting the simulated GNSS signal in the direction of the GNSS spoofer. The parameters can be generated based on the provided one or more characteristics of the detected spoofer signal.

20 Claims, 8 Drawing Sheets

GNSS Spoofing Protection
200

GNSS Spoofing
100

GNSS Spoofing Protection
200

Transmit Power Calculator
400

Spoofer Location
320a

Distance
Calculator
500

Free Space Loss
Calculator
510

Expected Power
Calculator
520

Power Adjustment
Calculator
530

Transmit Power
340a

False Satellite Ephemeris Generator
430

True Satellite Ephemeris
600

Satellite Location
Extractor
610

Satellite Location
Adjuster
620

Ephemeris
Reconstructor
630

False Satellite Ephemeris
340d

700

Processing Platform
800

GLOBAL NAVIGATION SATELLITE SYSTEM (GNSS) SPOOFER PROTECTION

FIELD OF DISCLOSURE

The present disclosure relates to global navigation satellite systems (GNSS), and more particularly to spoofer protection for GNSS receivers.

BACKGROUND

GNSS technology has been adopted into widespread use to provide location, timing, and navigation assistance for countless applications. GNSS includes many types of satellite based navigation systems including, for example, global positioning system (GPS) and Galileo. Many military applications depend on GNSS, for example, to provide targeting of weapons systems and navigation functionality for aircraft, ships, ground vehicles, and ground troops. Unfortunately, GNSS receivers can be spoofed by adversaries. These adversaries may broadcast false GNSS signals that mimic authentic GNSS signals and introduce errors that render the GNSS receivers ineffective.

Figure 1:
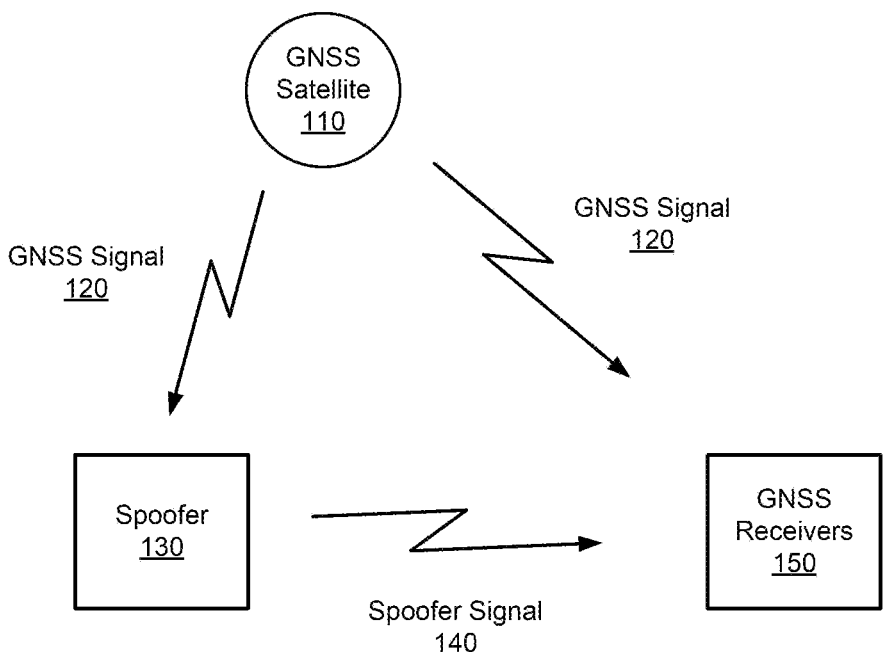
FIG. 1 illustrates an example spoofing scenario of a GNSS receiver.

Although the following Detailed Description will proceed with reference being made to illustrative embodiments, many alternatives, modifications, and variations thereof will be apparent in light of this disclosure.

DETAILED DESCRIPTION

Techniques are provided herein for spoofer protection for GNSS receivers. As noted above, GNSS receivers can be spoofed by malicious actors that transmit fake signals which mimic an authentic GNSS signal. Such spoofing, if not detected, can cause a given GNSS receiver to track a false signal and calculate erroneous timing, position, and navigation information. This can potentially be more dangerous to the user of the receiver than simple jamming since the user may not know that the provided information is wrong, whereas a user will more likely know when a receiver is being jammed.

Although military grade GNSS receivers generally have some level of spoofing protection, many other GNSS receivers are designed to be small, portable, and low cost, and typically do not possess built in protection capabilities to mitigate the effects of spoofing signals. Adding such protective measures to these receivers would, in many instances, be expensive and impractical.

To this end, and in accordance with an embodiment of the present disclosure, a GNSS spoofer protection system is disclosed which neutralizes or otherwise impedes GNSS spoofer systems, thereby providing protection to any number of GNSS receivers, in the geographic area in which the spoofer may otherwise have an impact, and without requiring any modifications to those receivers. In an example, a GNSS spoofer protection system is provided that determines one or more characteristics of the spoofing signal and generates a simulated GNSS signal, using adjusted parameters based on those one or more characteristics. The simulated GNSS signal, or spoofer blocking signal, is then transmitted in the direction or geographic area of the GNSS spoofer. This simulated GNSS signal essentially spoofs the spoofer, causing the spoofer to transmit spoofing signals with invalid or otherwise unusable data that most GNSS receivers will reject in the course of normal operation, allowing them to instead lock on to legitimate GNSS signals broadcast from satellites.

In another example, a methodology for providing spoofer protection for GNSS receivers is provided and includes receiving one or more characteristics of a detected spoofer signal that is transmitted by a GNSS spoofer. The one or more characteristics may be provided, for instance, by an anti-jamming GNSS system or a dedicated GNSS spoofer characterization system. The one or more characteristics of the detected spoofer signal may include, for example, one or more of the direction to the GNSS spoofer, the location of the GNSS spoofer, the power level of the received spoofing signal, and the code type of the detected spoofer signal. The methodology continues with generating parameters for a simulated GNSS signal that is configured to block the GNSS spoofer and transmitting the simulated GNSS signal in the direction of the GNSS spoofer. The parameters can be generated, for example, based on the provided one or more characteristics of the detected spoofer signal.

The techniques describe herein can be applied to any GNSS signals which may include for example signals of the existing global positioning system (GPS), the Galileo system, the global orbiting navigational satellite system (GLO-NASS), or any other such publicly available or proprietary systems that provide global navigation.

It will be appreciated that the techniques described herein may provide improved performance and reliability for GNSS receivers located over a relatively wide geographic area that might otherwise be adversely impacted by a spoofing entity, by blocking the source of spoofer signals from that entity, compared to other methods that require modification or retrofitting of the GNSS receivers to add protective capabilities. Numerous embodiments and applications will be apparent in light of this disclosure.

System Architecture

FIG. 1 illustrates an example spoofing scenario 100 of a GNSS receiver. In this example scenario, GNSS satellite 110 broadcasts a legitimate GNSS signal 120. The GNSS spoofer 130 receives the legitimate GNSS signal 120 and generates a spoofer signal 140 based on information included in that legitimate GNSS signal. For example, the spoofer may create the spoofer signal 140 as a modified version of the legitimate signal 120 by introducing errors into that signal or otherwise modifying the signal for any desired strategic purpose. The GNSS spoofer transmits this spoofer signal 140 at a power level that is sufficiently high such that it exceeds the power level of the legitimate GNSS signal 120 at GNSS receivers 150 located within a relatively wide region around the spoofer 130. As a result, the GNSS receivers 150 will typically lock on to the spoofer signal 140 instead of the legitimate signal 120, which in turn causes those receivers to provide erroneous results.

Figure 2:
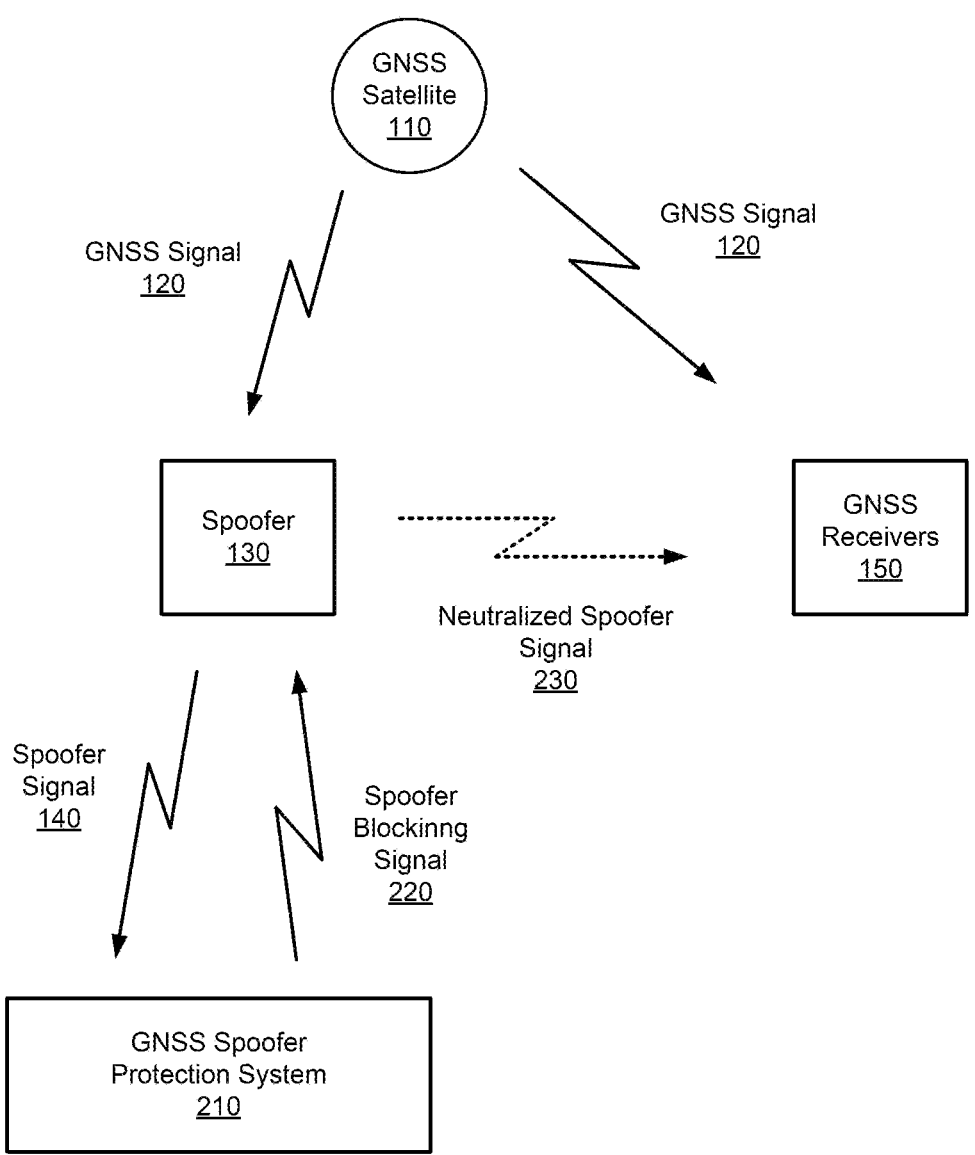
FIG. 2 illustrates an implementation of a GNSS spoofer protection system, configured in accordance with certain embodiments of the present disclosure.

FIG. 2 illustrates an implementation 200 of a GNSS spoofer protection system 210, configured in accordance with certain embodiments of the present disclosure. In this example, the GNSS spoofer protection system 210 is shown to receive the spoofer signal 140 and generate a spoofer blocking signal 220 based on one or more characteristics of the spoofer signal. In some examples, the spoofer blocking signal 220 is transmitted in the direction of the spoofer 130 to reduce impacts on other receivers in the area. The spoofer blocking signal 220 is configured to disrupt the spoofer 130 and thereby neutralize the spoofer signal 230, as will be described in greater detail below. In some situations, this type of electronic attack on the spoofer may be preferable to a physical or kinetic attack.

Figure 3:
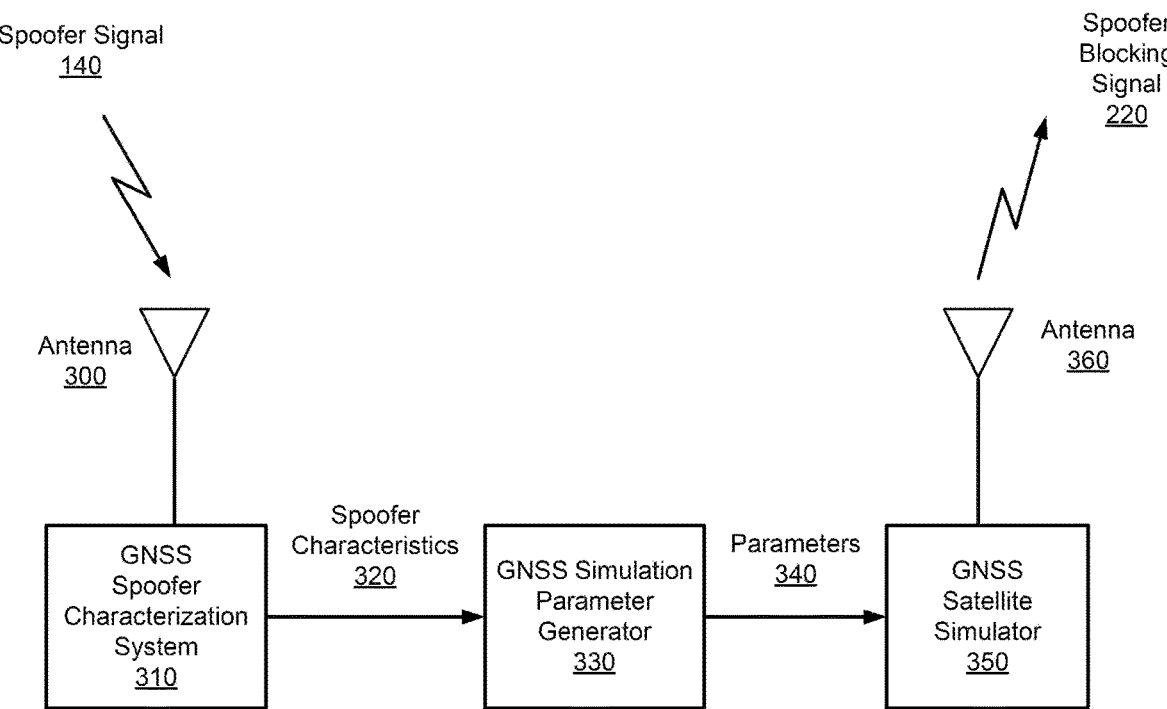
FIG. 3 is a block diagram of the GNSS spoofer protection system of FIG. 2, configured in accordance with certain embodiments of the present disclosure.

FIG. 3 is a block diagram of the GNSS spoofer protection system 210 of FIG. 2, configured in accordance with certain embodiments of the present disclosure. The GNSS spoofer protection system 210 is shown to include a first antenna 300, a GNSS spoofer characterization system 310, a GNSS simulation parameter generator 330, a GNSS satellite simulator 350, and a second antenna 360.

The GNSS spoofer characterization system 310 is configured to detect GNSS spoofers 130 and analyze the spoofing signals 140 transmitted by the detected GNSS spoofer to determine one or more characteristics 320 of the spoofing signals 140. In some examples, the spoofer characterization system 310 may be part of an anti-jam (AJ) GNSS system, but it may be a stand-alone system as well. In some embodiments, the one or more characteristics of the detected spoofer signal 140 include one or more of the following: the direction or angle of arrival (AOA) from which the spoofer signal arrived (e.g., a direction to the GNSS spoofer); the location of the GNSS spoofer; the power level of the received spoofing signal, the code type of the detected spoofer signal (e.g., civilian, military, etc.), and the type of spoofing (e.g., repeater spoofing or code generator spoofing), although other characteristics of interest are possible. The GNSS spoofer characterization system 310 is configured to detect and characterize GNSS spoofing signals and may employ any suitable techniques for detection and characterization of the GNSS spoofer 130 and spoofer signals 140. For example, in some embodiments, the AOA and line of bearing (LOB) may be determined using beamforming or nullforming techniques applied to an antenna array 300 and/or other sensors (e.g., focal plane imaging arrays) through which the signals of interest are received. Similarly, for example, in some embodiments, the location of the spoofer may be determined through triangulation or time difference of arrival techniques, and the code type may be determined using matched filtering or spectral analysis or a look-up table (LUT), although other techniques are possible. Range finding techniques (e.g., ping, or other reflection-based technique) may also be used to identify the location of a spoofer 130. Transmit power can be determined, once range and direction are established, along with received power. In other examples, some or all of the one or more characteristics 320 of the spoofing signals 140 may be determined using reconnaissance, such as geolocation data and/or RF signal analysis provided by aerial or ground-based surveillance platforms (e.g., a drone).

The GNSS simulation parameter generator 330 is configured to generate parameters 340 for a simulated GNSS signal 220, that is configured to block the GNSS spoofer. The parameters 340 are generated based, at least in part, on the one or more characteristics 320 of the GNSS spoofer 130 and spoofer signals 140 as provided by the GNSS spoofer characterization system 310. The techniques used for generating these parameters are described in greater detail below.

The GNSS satellite simulator 350 is configured to generate the simulated GNSS signal as a spoofer blocking signal 220, based on the parameters 340 provided by the GNSS simulation parameter generator 330, and to transmit that signal in the direction of the GNSS spoofer 130. Any suitable satellite simulator may be used for this purpose. In some embodiments, the spoofer blocking signal 220 is transmitted through an antenna array 360 that is steered in the desired direction to minimize impact to the surrounding area.

At a high level of description, the GNSS spoofer protection system 210 is configured to use the spoofer blocking signal 220 to confuse the GNSS spoofer 130. For example, in the case of a repeater spoofer, which re-broadcasts the signals that it receives, the spoofer blocking signal 220 is generated in such a way that the GNSS receivers 150 that track the repeated version of the blocking signal will reject that signal as invalid due to errors induced in the signal including invalid ephemeris data and modified satellite status indicators, as will be described below. In the case of a code generating spoofer, which needs to determine its own position to generate spoofing signals that look valid to the GNSS receivers 150, the spoofer blocking signal 220 can confuse the spoofer by causing it to think that it is in a different location than its actual location, which can corrupt the generated spoofing signal transmitted to the GNSS receivers 150, as will also be described below.

Figure 4:
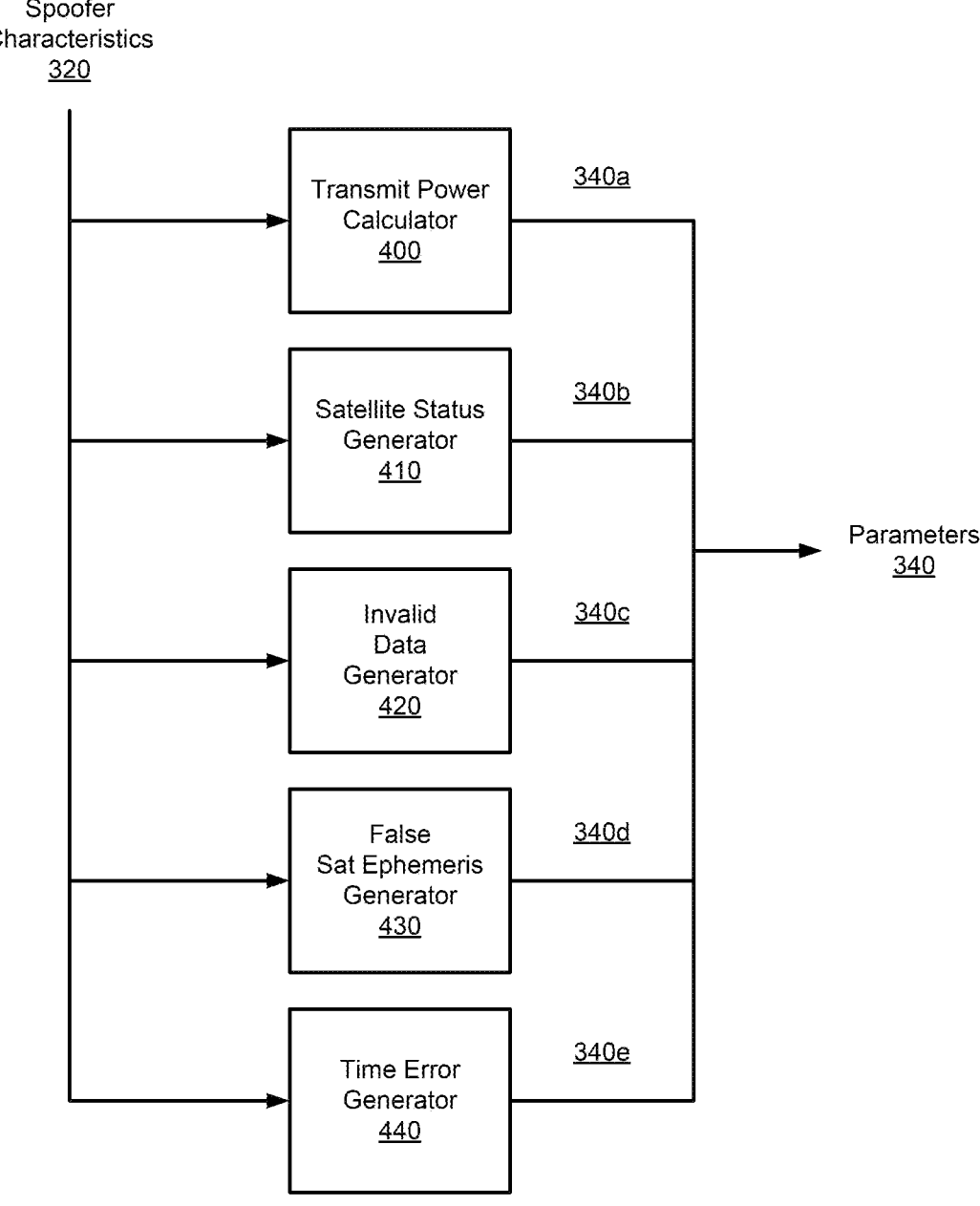
FIG. 4 is a block diagram of a GNSS simulation parameter generator of the GNSS spoofer protection system of FIG. 3, configured in accordance with certain embodiments of the present disclosure.

FIG. 4 is a block diagram of a GNSS simulation parameter generator 330 of the GNSS spoofer protection system 210 of FIG. 3, configured in accordance with certain embodiments of the present disclosure. The GNSS simulation parameter generator 330 is shown to include a transmit power calculator 400, a satellite status generator 410, an invalid data generator 420, a false satellite ephemeris generator 430, and a time error generator 440. In some embodiments, any one or more of these components may be used in any combination.

The transmit power calculator 400 is described in greater detail below, but at a high level the calculator is configured to calculate a transmit power 340a for the spoofer blocking signal 220. The transmit power 340a is one of the parameters 340 that are provided to the GNSS satellite simulator 350 and is selected to be of sufficient power so that the spoofer 130 will lock on to the blocking signal 220 instead of the legitimate GNSS signal 120.

The satellite status generator 410 is configured to select a satellite status 340b as one of the parameters 340 that are provided to the GNSS satellite simulator 350. GNSS signals typically employ an SVID that is included in a message encoded in the signal. The SVID identifies the particular satellite, in the constellation of satellites, from which the signal was transmitted. The satellite status generator 410 may direct the simulator 350 to include a satellite status in the spoofer blocking signal 250 to indicates a problem with the satellite associated with the SVID. This may cause the GNSS receivers 150 to ignore the spoofer signal 230.

The invalid data generator 420 is configured to set a data validity indicator to an invalid state as one of the parameters. Different code types (e.g., civilian codes, military codes, acquisition codes, timing codes, etc.) have various mechanisms, such as data validity indicator message fields, to indicate whether or not the data is valid. The invalid data generator 420 may be used to instruct the simulator 350 to include an invalid state indicator in the data of the spoofer blocking signal 250 to cause the spoofer to malfunction or otherwise neutralize the spoofer signal 230.

The false satellite ephemeris generator 430 is described in greater detail below, but at a high level the generator is configured to configured to introduce errors to the satellite ephemeris.

The time error generator 440 is configured to introduce timing errors in the spoofer blocking signal 250 as one of the parameters to the simulator 350. In some embodiments, the timing properties may be modified by introducing time error to the time GNSS signal received from the spoofer 130.

In some embodiments, any other suitable data fields in the spoofer blocking signal 250 may be modified to neutralize the spoofer signal 230.

Figure 5:
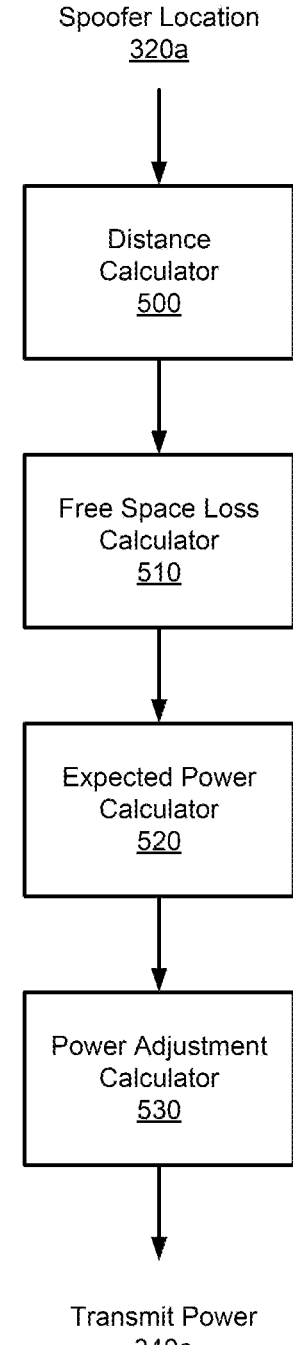
FIG. 5 is a block diagram of a transmit power calculator of the GNSS simulation parameter generator of FIG. 4, configured in accordance with certain embodiments of the present disclosure.

FIG. 5 is a block diagram of a transmit power calculator 400 of the GNSS simulation parameter generator 330 of FIG. 4, configured in accordance with certain embodiments of the present disclosure. The transmit power calculator 400 is shown to include a distance calculator 500, a free space loss calculator 510, an expected power calculator 520, and a power adjustment calculator 530.

The distance calculator 500 is configured to determine a distance to the GNSS spoofer based on the spoofer location provided by the spoofer characterization system 310. In some embodiments, the distance may be calculated as a Euclidean distance between the spoofer location and the known location of the GNSS spoofer protection system 210.

The free space loss calculator 510 is configured to calculate a free space transmission loss from the GNSS spoofer protection system 210 to the GNSS spoofer 130 based on the distance. In some embodiments, the free space transmission loss as calculated as being proportional to the inverse of the square of the distance.

The expected power calculator 520 is configured to calculate an expected GNSS signal power for the GNSS spoofer at the spoofer location. GNSS specifications can used to provide the expected received GNSS signal power for any location on the Earth as a function of time.

The power adjustment calculator 530 is configured to calculate a simulated GNSS signal power, as one of the parameters, based on the free space loss and the expected GNSS signal power for the GNSS spoofer at the spoofer location. For example, the power level for transmission of the simulated GNSS signal 220 may be selected such that the power of that signal received at the spoofer, after being attenuated by free space loss, is greater than the expected power of the GNSS signal 120 at the spoofer location. That power level should cause the spoofer 130 to lock on to the blocking signal 220 instead of the legitimate GNSS signal 120.

Figure 6:
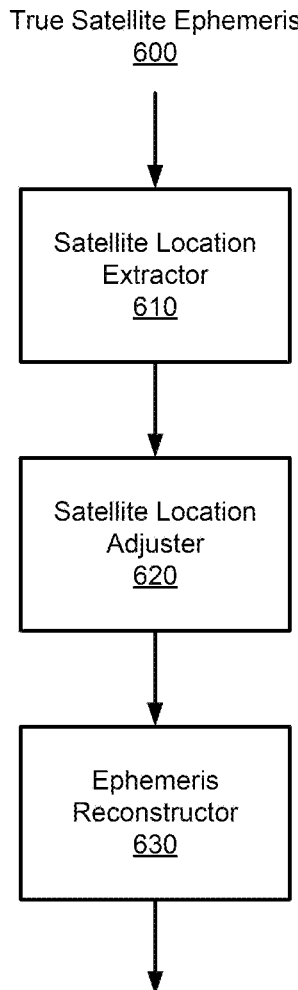
FIG. 6 is a block diagram of a false satellite ephemeris generator of the GNSS simulation parameter generator of FIG. 4, configured in accordance with certain embodiments of the present disclosure.

FIG. 6 is a block diagram of a false satellite ephemeris generator 430 of the GNSS simulation parameter generator 330 of FIG. 4, configured in accordance with certain embodiments of the present disclosure. The false satellite ephemeris generator 430 is shown to include a satellite location extractor 610, a satellite location adjuster 620, and an ephemeris reconstructor 630.

The satellite location extractor 610 is configured to extract satellite locations from a true satellite ephemeris. The true satellite ephemeris is a database or formula to that provides the location of every GNSS satellite as function of time.

The satellite location adjuster 620 is configured to add errors to the extracted satellite locations to generate false satellite locations.

The ephemeris reconstructor 630 is configured to generate a false satellite ephemeris, comprising the false satellite locations, as one of the parameters to be provided to the simulator 350. The spoofer blocking signal 250, containing erroneous satellite locations, may thus cause the spoofer to malfunction or otherwise neutralize the spoofer signal 230.

Methodology

Figure 7:
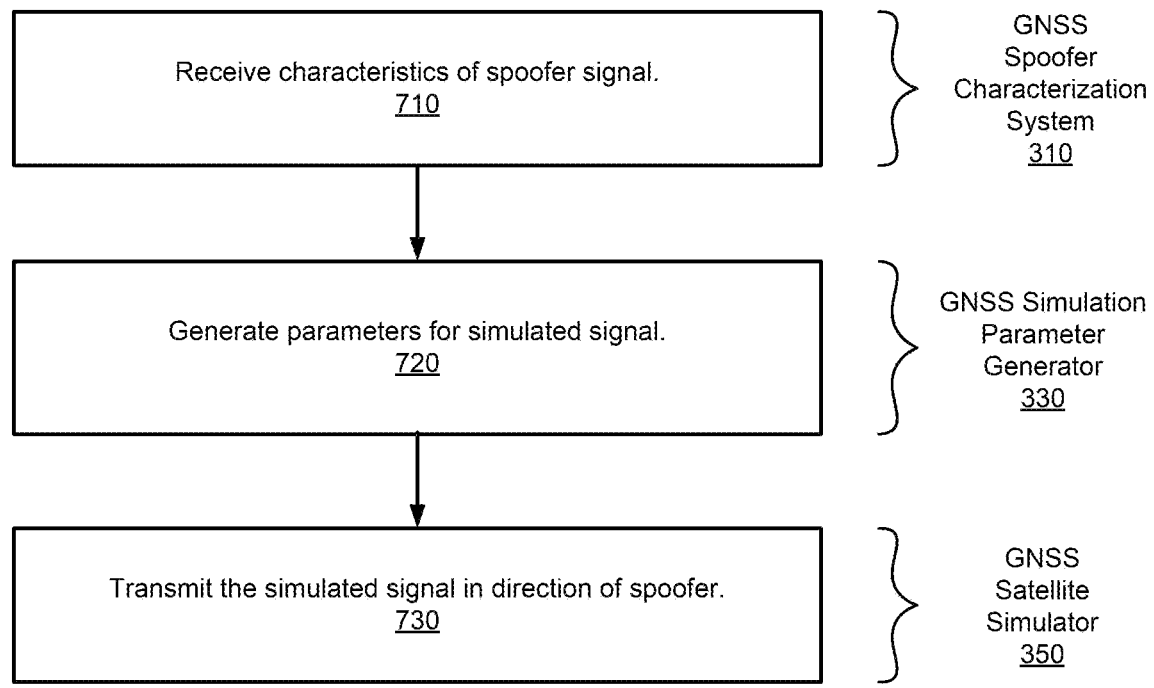
FIG. 7 is a flowchart illustrating a methodology for GNSS spoofer protection, in accordance with an embodiment of the present disclosure.

FIG. 7 is a flowchart illustrating a methodology 700 for GNSS spoofer protection, in accordance with an embodiment of the present disclosure. As can be seen, example method 700 includes a number of phases and sub-processes, the sequence of which may vary from one embodiment to another. However, when considered in aggregate, these phases and sub-processes form a process for operation of the GNSS spoofer protection system 210, in accordance with certain of the embodiments disclosed herein, for example as illustrated in FIGS. 1-6, as described above. However other system architectures can be used in other embodiments, as will be apparent in light of this disclosure. To this end, the correlation of the various functions shown in FIG. 7 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 700 commences, at operation 710, by receiving one or more characteristics of a detected spoofer signal transmitted by a GNSS spoofer. The one or more characteristics can be provided by, for example, an anti-jamming GNSS system or other suitable source such as a dedicated GNSS spoofer characterization system. In some embodiments, the one or more characteristics may include one or more of a direction to the GNSS spoofer, a location of the GNSS spoofer, and a code type of the detected spoofer signal.

At operation 720, parameters are generated for a simulated GNSS signal that is configured to block the GNSS spoofer. The parameters are based on the one or more characteristics of the detected spoofer signal and provided to a GNSS satellite simulator. In some embodiments, the generated parameters include one or more of a simulated GNSS signal power, a satellite status problem indicator associated with an SVID, a data validity indicator set to an invalid state, a satellite ephemeris comprising erroneous satellite locations, and erroneous timing properties, as previously described.

At operation 730, the simulated GNSS signal is transmitted in the direction of the GNSS spoofer. In some embodiments, the transmission is performed by a GNSS satellite simulator which is also referred to as a Pseudolite.

In some embodiments, additional operations may be performed, as previously described in connection with the system. For example, a free space transmission loss to the GNSS spoofer may be calculated based on a determined distance to the spoofer, and the simulated GNSS signal power may be calculated based on the free space loss and the expected GNSS signal power for the GNSS spoofer at the spoofer location.

Example System

Figure 8:
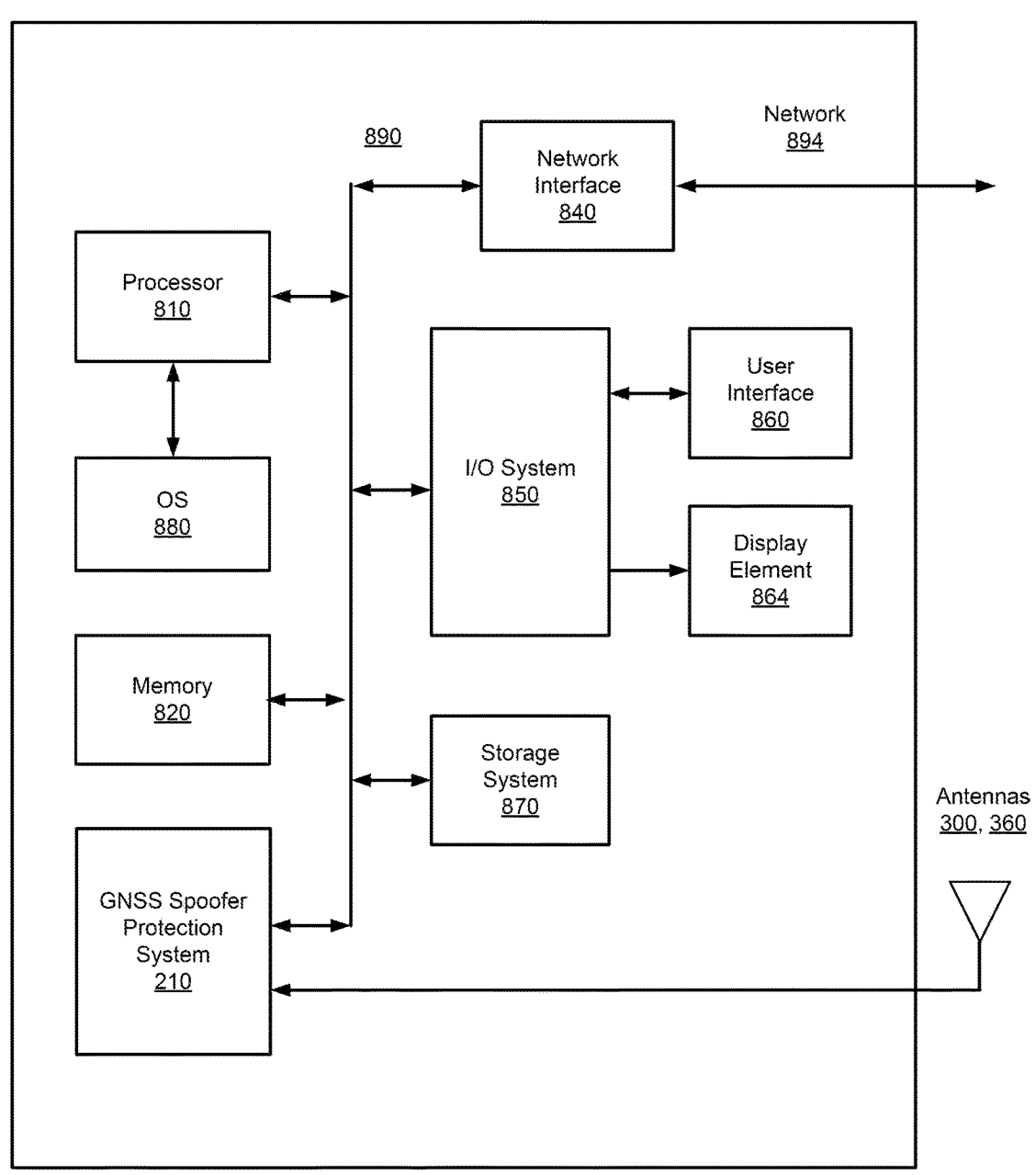
FIG. 8 is a block diagram of a processing platform configured to provide GNSS spoofer protection, in accordance with an embodiment of the present disclosure.

FIG. 8 is a block diagram of a processing platform 800 configured to provide GNSS spoofer protection, in accordance with an embodiment of the present disclosure. In some embodiments, platform 800, or portions thereof, may be hosted on, or otherwise be incorporated into the electronic systems of an aircraft, ship, ground station, or man-portable system deployment.

In some embodiments, platform 800 may comprise any combination of a processor 810, memory 820, a network interface 840, an input/output (I/O) system 850, a user interface 860, a display element 864, a storage system 870, GNSS spoofer protection system 210, and antennas 300, 360. As can be further seen, a bus and/or interconnect 890 is also provided to allow for communication between the various components listed above and/or other components not shown. Platform 800 can be coupled to a network 894 through network interface 840 to allow for communications with other computing devices, platforms, devices to be controlled, or other resources. Other componentry and functionality not reflected in the block diagram of FIG. 8 will be apparent in light of this disclosure, and it will be appreciated that other embodiments are not limited to any particular hardware configuration.

Processor 810 can be any suitable processor, and may include one or more coprocessors or controllers, such as an audio processor, a graphics processing unit, or hardware accelerator, to assist in the execution of mission software and/or any control and processing operations associated with platform 800, including operation of the GNSS spoofer protection system 210. In some embodiments, the processor 810 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 810 may be implemented as a complex instruction set computer (CISC) or a reduced instruction set computer (RISC) processor. In some embodiments, processor 810 may be configured as an x86 instruction set compatible processor.

Memory 820 can be implemented using any suitable type of digital storage including, for example, flash memory and/or random access memory (RAM). In some embodiments, the memory 820 may include various layers of memory hierarchy and/or memory caches as are known to those of skill in the art. Memory 820 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 810 may be configured to execute an Operating System (OS) 880 which may comprise any suitable operating system, such as Google Android (Google Inc., Mountain View, CA), Microsoft Windows (Microsoft Corp., Red-mond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 800, and therefore may also be implemented using any suitable existing or subsequently-developed platform.

Network interface circuit 840 can be any appropriate network chip or chipset which allows for wired and/or wireless connection between other components of platform 800 and/or network 894, thereby enabling platform 800 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of platform 800. I/O devices may include, but not be limited to, user interface 860 and display element 864. User interface 860 may include devices (not shown) such as a touchpad, cockpit display unit, keyboard, and mouse, etc., for example, to allow the user to control the system. Display element 864 may be configured to display information to a user. I/O system 850 may include a graphics subsystem configured to perform processing of images for rendering on the display element 864. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 810 or any chipset of platform 800.

It will be appreciated that in some embodiments, the various components of platform 800 may be combined or integrated in a system-on-a-chip (SoC) architecture. In some embodiments, the components may be hardware components, firmware components, software components or any suitable combination of hardware, firmware, or software.

GNSS spoofer protection system 210 is configured to disrupt GNSS spoofers to provide protection for GNSS receivers over a relatively wide geographic area, as described previously. GNSS spoofer protection system 210 may include any or all of the circuits/components illustrated in FIGS. 3-6, as described above. These components can be implemented or otherwise used in conjunction with a variety of suitable software and/or hardware that is coupled to or that otherwise forms a part of platform 800. These components can additionally or alternatively be implemented or otherwise used in conjunction with user I/O devices that are capable of providing information to, and receiving information and commands from, a user.

In various embodiments, platform 800 may be implemented as a wireless system, a wired system, or a combination of both. When implemented as a wireless system, platform 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hardcoded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a spoofer protection system for global navigation satellite systems (GNSS), the system comprising: an GNSS spoofer characterization system configured to provide one or more characteristics of a detected spoofer signal transmitted by a GNSS spoofer, wherein the one or more characteristics of the detected spoofer signal include a direction to the GNSS spoofer; a GNSS simulation parameter generator configured to generate parameters for a simulated GNSS signal, the simulated GNSS signal configured to block the GNSS spoofer, the parameters based on the one or more characteristics of the detected spoofer signal; and a GNSS satellite simulator configured to transmit the simulated GNSS signal in the direction of the GNSS spoofer.

Example 2 includes the system of Example 1, wherein the one or more characteristics include a spoofer location, and the GNSS simulation parameter generator includes a transmit power calculator comprising: a distance calculator configured to determine a distance to the GNSS spoofer based on the spoofer location; a free space loss calculator configured to calculate a free space transmission loss to the GNSS spoofer based on the distance; an expected power calculator configured to calculate an expected GNSS signal power for the GNSS spoofer at the spoofer location; and a power adjustment calculator configured to calculate a simulated GNSS signal power, as one of the parameters, based on the free space loss and the expected GNSS signal power for the GNSS spoofer at the spoofer location.

Example 3 includes the system of any of Examples 1 or 2, wherein the GNSS simulation parameter generator includes a satellite status generator configured to modify a satellite status field to indicate a problem with the satellite, as one of the parameters.

Example 4 includes the system of any of Examples 1-3, wherein the GNSS simulation parameter generator includes an invalid data generator configured to set a data validity indicator to an invalid state as one of the parameters.

Example 5 includes the system of any of Examples 1-4, wherein the GNSS simulation parameter generator includes a false satellite ephemeris generator comprising: a satellite location extractor configured to extract satellite locations from a true satellite ephemeris; a satellite location adjuster configured to add errors to the satellite locations to generate false satellite locations; and an ephemeris reconstructor configured to generate a false satellite ephemeris, as one of the parameters, the false satellite ephemeris including the false satellite locations.

Example 6 includes the system of any of Examples 1-5, wherein the GNSS simulation parameter generator includes a time error generator configured to introduce timing errors to the detected spoofer signal as one of the parameters.

Example 7 includes the system of any of Examples 1-6, wherein the GNSS is one of a Global Positioning System or a Galileo satellite system.

Example 8 includes the system of any of Examples 1-7, wherein the GNSS simulation parameter generator includes one or more processors and one or more processor-readable mediums encoded with instructions that when executed by the one or more processors cause a process to be carried out to generate parameters for a simulated GNSS signal based on the one or more characteristics of the detected spoofer signal.

Example 9 is a computer program product including one or more non-transitory machine-readable mediums encoded with instructions that when executed by one or more processors cause a process to be carried out for spoofer protection for global navigation satellite systems (GNSS), the process comprising: receiving one or more characteristics of a detected spoofer signal from a GNSS spoofer characterization system, the spoofer signal transmitted by a GNSS spoofer, wherein the one or more characteristics of the detected spoofer signal include a direction to the GNSS spoofer; generating parameters for a simulated GNSS signal, the simulated GNSS signal configured to block the GNSS spoofer, the parameters based on the characteristics of the detected spoofer signal; and transmitting the simulated GNSS signal in the direction of the GNSS spoofer.

Example 10 includes the computer program product of Example 9, wherein the one or more characteristics include a spoofer location, the parameters include a simulated GNSS signal power, and the process further comprises: determining a distance to the GNSS spoofer based on the spoofer location; calculating a free space transmission loss to the GNSS spoofer based on the distance; calculating an expected GNSS signal power for the GNSS spoofer at the spoofer location; and calculating a simulated GNSS signal power, as one of the parameters, based on the free space loss and the expected GNSS signal power for the GNSS spoofer at the spoofer location.

Example 11 includes the computer program product of Examples 9 or 10, wherein the parameters include a satellite vehicle identifier (SVID), and the process further comprises modifying a satellite status field to indicate a problem with the satellite associated with the SVID, as one of the parameters.

Example 12 includes the computer program product of any of Examples 9-11, wherein the parameters include a data validity indicator, and the process further comprises setting the data validity indicator to an invalid state.

Example 13 includes the computer program product of any of Examples 9-12, wherein the parameters include a satellite ephemeris, and the process further comprises adding errors to the satellite ephemeris.

Example 14 includes the computer program product of any of Examples 9-13, wherein the process further comprises introducing timing errors to the detected spoofer signal as one of the parameters.

Example 15 is a method for spoofer protection for global navigation satellite systems (GNSS), the method comprising: receiving one or more characteristics of a detected spoofer signal from a GNSS spoofer characterization system, the spoofer signal transmitted by a GNSS spoofer, wherein the one or more characteristics of the detected spoofer signal include a direction to the GNSS spoofer; generating parameters for a simulated GNSS signal, the simulated GNSS signal configured to block the GNSS spoofer, the parameters based on the one or more characteristics of the detected spoofer signal; and transmitting the simulated GNSS signal in the direction of the GNSS spoofer.

Example 16 includes the method of Example 15, wherein the one or more characteristics include a spoofer location, the parameters include a simulated GNSS signal power, and the method further comprises: determining a distance to the GNSS spoofer based on the spoofer location; calculating a free space transmission loss to the GNSS spoofer based on the distance; calculating an expected GNSS signal power for the GNSS spoofer at the spoofer location; and calculating a simulated GNSS signal power, as one of the parameters, based on the free space loss and the expected GNSS signal power for the GNSS spoofer at the spoofer location.

Example 17 includes the method of Examples 15 or 16, wherein the parameters include a satellite vehicle identifier (SVID), and the method further comprises modifying a satellite status field to indicate a problem with the satellite associated with the SVID, as one of the parameters.

Example 18 includes the method of any of Examples 15-17, wherein the parameters include a data validity indicator, and the method further comprises setting the data validity indicator to an invalid state.

Example 19 includes the method of any of Examples 15-18, wherein the parameters include a satellite ephemeris, and the method further comprises adding errors to the satellite ephemeris.

Example 20 includes the method of any of Examples 15-19, wherein the method further comprises introducing timing errors to the detected spoofer signal as one of the parameters.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A spoofer protection system for global navigation satellite systems (GNSS), the system comprising:
   an GNSS spoofer characterization system configured to provide one or more characteristics of a detected spoofer signal transmitted by a GNSS spoofer, wherein the one or more characteristics of the detected spoofer signal include a direction to the GNSS spoofer;
   a GNSS simulation parameter generator configured to generate parameters for a simulated GNSS signal, the simulated GNSS signal configured to block the GNSS spoofer, the parameters based on the one or more characteristics of the detected spoofer signal; and
   a GNSS satellite simulator configured to transmit the simulated GNSS signal in the direction of the GNSS spoofer.

2. The system of claim 1, wherein the one or more characteristics include a spoofer location, and the GNSS simulation parameter generator includes a transmit power calculator comprising:
   a distance calculator configured to determine a distance to the GNSS spoofer based on the spoofer location;
   a free space loss calculator configured to calculate a free space transmission loss to the GNSS spoofer based on the distance;
   an expected power calculator configured to calculate an expected GNSS signal power for the GNSS spoofer at the spoofer location; and
   a power adjustment calculator configured to calculate a simulated GNSS signal power, as one of the parameters, based on the free space loss and the expected GNSS signal power for the GNSS spoofer at the spoofer location.

3. The system of claim 1, wherein the GNSS simulation parameter generator includes a satellite status generator configured to modify a satellite status field to indicate a problem with the satellite, as one of the parameters.

4. The system of claim 1, wherein the GNSS simulation parameter generator includes an invalid data generator configured to set a data validity indicator to an invalid state as one of the parameters.

5. The system of claim 1, wherein the GNSS simulation parameter generator includes a false satellite ephemeris generator comprising:

a satellite location extractor configured to extract satellite locations from a true satellite ephemeris;

a satellite location adjuster configured to add errors to the satellite locations to generate false satellite locations; and an ephemeris reconstructor configured to generate a false satellite ephemeris, as one of the parameters, the false satellite ephemeris including the false satellite locations.

6. The system of claim 1, wherein the GNSS simulation parameter generator includes a time error generator configured to introduce timing errors to the detected spoofer signal as one of the parameters.

7. The system of claim 1, wherein the GNSS is one of a Global Positioning System or a Galileo satellite system.

8. The system of claim 1, wherein the GNSS simulation parameter generator includes one or more processors and one or more processor-readable mediums encoded with instructions that when executed by the one or more processors cause a process to be carried out to generate parameters for a simulated GNSS signal based on the one or more characteristics of the detected spoofer signal.

9. A computer program product including one or more non-transitory machine-readable mediums encoded with instructions that when executed by one or more processors cause a process to be carried out for spoofer protection for global navigation satellite systems (GNSS), the process comprising:

receiving one or more characteristics of a detected spoofer signal from a GNSS spoofer characterization system, the spoofer signal transmitted by a GNSS spoofer, wherein the one or more characteristics of the detected spoofer signal include a direction to the GNSS spoofer;

generating parameters for a simulated GNSS signal, the simulated GNSS signal configured to block the GNSS spoofer, the parameters based on the characteristics of the detected spoofer signal; and transmitting the simulated GNSS signal in the direction of the GNSS spoofer.

10. The computer program product of claim 9, wherein the one or more characteristics include a spoofer location, the parameters include a simulated GNSS signal power, and the process further comprises:

determining a distance to the GNSS spoofer based on the spoofer location;

calculating a free space transmission loss to the GNSS spoofer based on the distance;

calculating an expected GNSS signal power for the GNSS spoofer at the spoofer location; and calculating a simulated GNSS signal power, as one of the parameters, based on the free space loss and the expected GNSS signal power for the GNSS spoofer at the spoofer location.

11. The computer program product of claim 9, wherein the parameters include a satellite vehicle identifier (SVID), and the process further comprises modifying a satellite status field to indicate a problem with the satellite associated with the SVID, as one of the parameters.

12. The computer program product of claim 9, wherein the parameters include a data validity indicator, and the process further comprises setting the data validity indicator to an invalid state.

13. The computer program product of claim 9, wherein the parameters include a satellite ephemeris, and the process further comprises adding errors to the satellite ephemeris.

14. The computer program product of claim 9, wherein the process further comprises introducing timing errors to the detected spoofer signal as one of the parameters.

15. A method for spoofer protection for global navigation satellite systems (GNSS), the method comprising:

receiving one or more characteristics of a detected spoofer signal from a GNSS spoofer characterization system, the spoofer signal transmitted by a GNSS spoofer, wherein the one or more characteristics of the detected spoofer signal include a direction to the GNSS spoofer;

generating parameters for a simulated GNSS signal, the simulated GNSS signal configured to block the GNSS spoofer, the parameters based on the one or more characteristics of the detected spoofer signal; and transmitting the simulated GNSS signal in the direction of the GNSS spoofer.

16. The method of claim 15, wherein the one or more characteristics include a spoofer location, the parameters include a simulated GNSS signal power, and the method further comprises:

determining a distance to the GNSS spoofer based on the spoofer location;

calculating a free space transmission loss to the GNSS spoofer based on the distance;

calculating an expected GNSS signal power for the GNSS spoofer at the spoofer location; and calculating a simulated GNSS signal power, as one of the parameters, based on the free space loss and the expected GNSS signal power for the GNSS spoofer at the spoofer location.

17. The method of claim 15, wherein the parameters include a satellite vehicle identifier (SVID), and the method further comprises modifying a satellite status field to indicate a problem with the satellite associated with the SVID, as one of the parameters.

18. The method of claim 15, wherein the parameters include a data validity indicator, and the method further comprises setting the data validity indicator to an invalid state.

19. The method of claim 15, wherein the parameters include a satellite ephemeris, and the method further comprises adding errors to the satellite ephemeris.

20. The method of claim 15, wherein the method further comprises introducing timing errors to the detected spoofer signal as one of the parameters.

* * * * *